United States Patent
Stuhr

(12) 
(10) Patent No.: US 6,651,928 B1
(45) Date of Patent: Nov. 25, 2003

(54) AIRCRAFT ENGINE NACELLES AND METHODS FOR THEIR MANUFACTURE

(75) Inventor: Victor K. Stuhr, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/235,411

(22) Filed: Sep. 5, 2002

(51) Int. Cl.⁷ .................................................. B64B 1/24
(52) U.S. Cl. ................................ 244/53 B; 244/117 R; 244/102 R
(58) Field of Search ........................... 244/53 B, 117 R, 244/119, 120, 100 R, 102 R; 137/15.1, 15.2

(56) References Cited

U.S. PATENT DOCUMENTS

| | | | |
|---|---|---|---|
| 2,604,276 A | 7/1952 | Huben | 244/15 |
| 2,846,165 A | 8/1958 | Axelson | 244/90 |
| 2,941,752 A | 6/1960 | Gluhareff | 244/46 |
| 3,109,610 A | 11/1963 | Quenzler et al | 244/15 |
| 3,237,891 A | 3/1966 | Wotton | 244/55 |
| 3,493,198 A | 2/1970 | Roed | 244/53 |
| 3,592,415 A | 7/1971 | Walley et al. | 244/55 |
| 3,680,816 A | 8/1972 | Mello | 244/46 |
| 3,738,595 A | 6/1973 | Bouchnik | 244/43 |
| 3,900,178 A * | 8/1975 | Tupolev et al. | 244/55 |
| 3,940,097 A | 2/1976 | Wilson et al. | 244/230 |
| 3,948,469 A | 4/1976 | Brown | 244/54 |
| 3,954,231 A | 5/1976 | Fraser | 244/83 C |
| 4,008,867 A | 2/1977 | Kaniut | 244/87 |

(List continued on next page.)

FOREIGN PATENT DOCUMENTS

| | | |
|---|---|---|
| EP | 000547266 A1 | 6/1993 |
| WO | WO 82/00048 | 1/1982 |

OTHER PUBLICATIONS

U.S. patent application Ser. No. 09/671,870, Clark, filed on Sep. 27, 2000.
U.S. patent application Ser. No. 09/816,985, Seidel, filed on Mar. 23, 2001.
U.S. patent application Ser. No 09/822,962, Balzer, filed on Mar. 30, 2001.
Scott, William, B., "YF–23A Previews Design Features of Future Fighters," Aviation Week & Space Technology, Jul. 2, 1990.
"Photos Show Key Features of YF–23A ATF," Aviation Week & Space Technology, Jul. 9, 1990 (pp. 54,55).
Dryden Flight Research Center, "TU–144LL, " "X–31A," "XB–70 Valkyrie," "B–58 Hustler" (5 pp.) Feb. 1998.
Rockwell/MBB X31 (p. 185).

(List continued on next page.)

*Primary Examiner*—J. Woodrow Eldred
(74) *Attorney, Agent, or Firm*—Perkins Coie LLP

(57) ABSTRACT

Engine nacelles for use with aircraft. In one embodiment, an engine nacelle includes an inlet having an inlet aperture and an outlet having an outlet aperture. In one aspect of this embodiment, the engine nacelle further includes a first side portion, a second side portion, and a third side portion. The first side portion can extend at least generally between a first edge portion of the inlet aperture and a third edge portion of the outlet aperture. The second side portion can be offset from the first side portion and extend at least generally between a second edge portion of the inlet aperture and a fourth edge portion of the outlet aperture to define a first interior portion. The third side portion can be offset from the second side portion and extend at least generally from the second edge portion of the inlet aperture toward the fourth edge portion of the outlet aperture to define a second interior portion. In another aspect of this embodiment, the first interior portion is configured to house an engine, and the second interior portion is configured to house a landing gear assembly.

63 Claims, 4 Drawing Sheets

U.S. PATENT DOCUMENTS

| | | | |
|---|---|---|---|
| 4,026,500 A | | 5/1977 | Grow .......................... 244/36 |
| 4,116,405 A | | 9/1978 | Bacchi et al. .............. 244/12.4 |
| 4,378,097 A | | 3/1983 | Ferguson et al. ......... 244/53 B |
| 4,478,377 A | | 10/1984 | Fletcher et al. ............ 244/12.5 |
| 4,478,378 A | | 10/1984 | Capuani .................... 244/12.5 |
| 4,579,300 A | | 4/1986 | Carr .......................... 244/12.1 |
| 4,767,083 A | | 8/1988 | Koenig et al. ............. 244/12.3 |
| 4,802,639 A | * | 2/1989 | Hardy et al. .................... 244/2 |
| 4,828,204 A | * | 5/1989 | Friebel ........................ 244/15 |
| 4,899,958 A | | 2/1990 | Horikawa ................. 244/53 B |
| 4,969,614 A | | 11/1990 | Capuani .................... 244/12.4 |
| 4,979,699 A | | 12/1990 | Tindell ..................... 244/53 B |
| D314,366 S | | 2/1991 | Waaland et al. ........... D12/333 |
| D317,003 S | | 5/1991 | Tribe et al. ................ D12/333 |
| 5,167,383 A | | 12/1992 | Nozaki ..................... 244/12.5 |
| 5,170,964 A | | 12/1992 | Enderle et al. ............... 244/52 |
| 5,209,428 A | | 5/1993 | Bevilaqua et al. ......... 244/12.3 |
| 5,216,879 A | | 6/1993 | Zysmaan ..................... 60/252 |
| 5,299,760 A | | 4/1994 | Finch et al. .............. 244/53 B |
| 5,322,242 A | | 6/1994 | Tracy .......................... 244/36 |
| 5,337,975 A | * | 8/1994 | Peinemann ............... 244/53 B |
| 5,496,001 A | | 3/1996 | Skow ........................ 244/119 |
| 5,529,263 A | | 6/1996 | Rudolph ..................... 244/55 |
| 5,542,625 A | | 8/1996 | Burhans, Jr. et al. ..... 244/45 R |
| RE35,387 E | | 12/1996 | Strom ...................... 244/75 R |
| D377,326 S | | 1/1997 | Grossman et al. ........ D12/16.1 |
| 5,636,813 A | * | 6/1997 | Hardy et al. ............. 244/118.1 |
| D381,938 S | | 8/1997 | Grossman et al. ........ D12/16.1 |
| D381,952 S | | 8/1997 | Carter, Jr. .................. D12/327 |
| D382,851 S | | 8/1997 | Knutson et al. ........... D12/333 |
| D386,143 S | | 11/1997 | Astaire ...................... D12/345 |
| 5,749,542 A | | 5/1998 | Hamstra et al. .......... 244/53 B |
| D399,816 S | | 10/1998 | Peacock .................... D12/333 |
| 5,842,666 A | | 12/1998 | Gerhardt et al. .............. 244/15 |
| 5,897,076 A | | 4/1999 | Tracy ..................... 244/117 A |
| 5,897,078 A | | 4/1999 | Burnham et al. ........ 244/177 R |
| 5,906,334 A | | 5/1999 | Chamay et al. ........... 244/53 B |
| 5,961,068 A | | 10/1999 | Wainfan et al. ............... 244/36 |
| D417,184 S | | 11/1999 | Hartmann et al. ......... D12/333 |
| 6,079,667 A | | 6/2000 | Gruensfelder ............. 244/53 B |
| 6,092,360 A | | 7/2000 | Hoag et al. ................ 60/39.02 |
| 6,138,957 A | | 10/2000 | Nastasi et al. .............. 244/219 |
| D437,284 S | | 2/2001 | Knutson et al. ........... D12/319 |
| D439,876 S | | 4/2001 | Simonov et al. ........... D12/342 |
| D453,014 S | | 1/2002 | Fraser ....................... D12/319 |

OTHER PUBLICATIONS

Roskam, Jan, Dr., "Airplane Design Part II: Preliminary Configuration Design and Integration of the Propulsion System," Roskam Aviation and Engineering Corporation, Ottawa, Kansas 1985 (pp. 76,78,81).

Poisson–Quinton, Phillippe, "Slender Wings for Civil and Military Aircraft," Twentieth Israel Annual Conference on Aviation and Astronautics, Feb. 22–23, 1978 (title page, pp. 57,58, figure 5).

NASA Technical Memoranudm, "Proceedings of NASA Conference on Supersonic Transport Feasibility Studies and Supporting Research," Sep. 17, 1963 (figures 44 & 45, p. 74).

NASA Contractor Report 165934, "Large Payload Capacity SST Concepts–Technical and Economic Feasibility," Contract NAS1–16150, Jul. 1982.

Taylor, Michael J.H., Janes'Pocket Book of Research and Experimental Aircraft, "North American XB–70A Valkyrie," Collier Books, New York, 1976 (p. 175).

Liebeck, R.H. et al., "AIAA 98–0438, Blended–Wing–Body Subsonic Commercial Transport," 36th Aerospace Sciences, Meeting & Exhibit, Jan. 12–15, 1998, Reno, Nevada (pp. 1,4).

Brennan, Heather, "Spotlight on . . . Daniel Raymer," AIAA Editorial Echoes Interview with Daniel Raymer, Spring 2000 http://www.aircraftdesign/com/spotlighton.html [Accessed Oct. 29, 2001].

Capone, Francis, J. and Reubush, David, E., "Effects of Varying Podded Nacelle–Nozzle Installations on Transonic Aeropropulsive Characteristics of a Supersonic Fighter Aircraft," NASA Technical Paper 2120, 1983 (pp. 83, 99).

"Dan Raymer" http://www.aircraftdesign.com/raymer.html [Accessed Oct. 29, 2001].

"Rockwell/MBB X–31 Makes Second Flight, Reaching 20,000–Ft. Altitude, Mach 0.6," Aviation Week & Space Techn., p. 117, Oct. 22, 1990.

Stinton, Darrol, "The Anatomy of the Aeroplane," Granada Publishing Limited, 1966 (pp. 27, 276, 274, 162).

Angelucci, Enzo, "World Encyclopedia of Civil Aircraft, from Leonardo da Vinci to the Present,"Crown Publishers, Inc., New York, 1981 (p. 364).

"Prototypes: Comparative Design Analysis," Aviation Week & Space Technology, Sep. 17, 1990 (p. 45).

North American XB–70–1 "Valkyrie", Historical Aviation Album, Temple City, California, 1964–69 (3 pgs).

General Specifications and Data (1pg.) http://proat10.theoinf.tu–ilmenau.de/XB–70/www2.intertain.net/xb70_3view–1.jpg [Accessed Jul. 11, 2002].

NASA Dryden Flight Research Center Photo Collection, Aug. 17, 1965 (1 page) http://www.dfc.nasa.gov/gallery/photo/XB–70/Small/ECN–792.jpg [Accessed Jul. 11, 2002].

Dryden Flight Research Center, XB–70A Taking Offi, 1967 (1 pg.) http://www.dfrc.nasa.gov/gallery/photo/XB–70/Small/E–16695.jpg [Accessed Jul. 11, 2002].

Dryden Flight Research Center, XB–70 Valkyrie 3–View, Feb. 1998 (1 pg.) http;//www.dfrc.nasa.gov/gallery/graphics/XB–70/Small/XB–70_3view.gif [Accessed Jul. 11, 2002].

North American XB–70A "Valkyrie" Museum Photo Archive (1 page) http://www/wpafb.af.mil/museum/research/bombers/b5/xb70–17.jpg [Accessed Jul 11, 2002].

North American XB–70 "Valkyrei" (2 pages) http://www/wpafb.af.mil/museum/modern_flight/mf37.htm [Accessed Jul 11, 2002].

http://proat10.theoin.tu–ilmenau.de/XB–70/www2.intertain.net/~thumper/gear–1.jpg [Accessed Jul 11, 2002].

Aircraft Conceptual Design Drawings & Pictures http://www.aircraftdesign.com/raymer.html [Accessed Oct. 30, 2001].

* cited by examiner

AIRCRAFT ENGINE NACELLES AND METHODS FOR THEIR MANUFACTURE

TECHNICAL FIELD

The following disclosure relates generally to aircraft engine nacelles and associated methods of manufacture and, more particularly, to aircraft engine nacelles having engine air inlets and landing gear mounting structures.

BACKGROUND

Aircraft having aft-mounted main wings often have engines positioned near the trailing edge of the main wing to counterbalance the weight of the fuselage extending forward of the main wing. In addition, such aircraft generally have main landing gears ("main gears") extending downward from the main wing forward of the engines to support the aircraft when on the ground. The relative positioning of the engines and the main gears in this configuration can raise a number of design problems.

One problem is the potential for foreign object damage (FOD) caused by debris kicked up by the main gear and ingested through an engine air inlet. One approach to overcome this problem has been to extend the engine air inlet forward to position the inlet aperture in front of the main gear. Another approach has been to route the engine air inlet through the wing to position the inlet aperture above the wing and shield it from the main gear. Yet another approach has been to install a screen or similar device over the inlet aperture to prevent FOD.

All of these approaches for preventing FOD have disadvantages related to aircraft weight, complexity, and drag. For example, extending the air inlet forward of the main gear increases airframe weight. Similarly, routing the air inlet through the wing not only increases airframe weight but also increases the structural complexity of the airframe. Further, providing a screen or the like over the inlet aperture has the disadvantage of increasing aerodynamic drag and reducing inlet efficiency.

Mounting the main gears to the wing can also raise a number of design problems. One problem is that the wing structure must be tailored to provide a wheel well and carry the main gear loads. This typically requires adding significant structural reinforcement around the wheel well and providing a substantial truss structure for mounting the main gear, both of which can add considerable weight to an airframe.

Another problem related to wing-mounted main gears is preventing a fuel tank puncture in the event of a main gear collapse. On most transport aircraft, the fuel tanks in the wings ("wing tanks") carry most of the fuel for the aircraft. If a main gear collapses beneath a wing tank, the main gear could puncture the wing tank. This problem is typically solved by not carrying fuel over the main gear, thus providing a "dry bay" in this region of the wing.

The dry bay solution has a number of drawbacks. One obvious drawback is the resulting reduction in fuel capacity. Another drawback is the unfavorable effect the dry bay has on aircraft balancing characteristics. Fuel in the wing tank can often be used to favorably balance the aircraft about its center of gravity (CG). The reduction of wing tank capacity caused by the dry bay, however, may require that other methods be used to balance the aircraft about the CG. Often, these other methods involve aerodynamically trimming the aircraft, which has the unfavorable effect of increasing the aerodynamic drag of the aircraft.

SUMMARY

The present invention is directed to engine nacelles for use with aircraft. In one embodiment, an engine nacelle for use with an aircraft wing includes an inlet having an inlet aperture positioned below the wing, an inlet wall portion extending aft of the inlet aperture, and a gear bay wall portion offset from the inlet wall portion. In one aspect of this embodiment, the inlet wall portion has an internal airflow surface configured to direct incoming air from the inlet aperture to an aircraft engine. In another aspect of this embodiment, the gear bay wall portion and the inlet wall portion at least partially define a gear bay configured to house a landing gear assembly having a wheel truck. The wheel truck can be positionable in a deployed static position offset from the engine nacelle to support at least a portion of the weight of the aircraft. In a further aspect of this embodiment, the deployed static position of the wheel truck can be aft of the inlet aperture.

In another embodiment, the aircraft wing includes a wing root portion and a wing tip portion, and the gear bay wall portion can have a first external airflow surface facing at least generally toward the wing root portion. In one aspect of this embodiment, the inlet wall portion is a first inlet wall portion and the internal airflow surface is a first internal airflow surface. The engine nacelle can further include a second inlet wall portion offset from the first inlet wall portion and having a second internal airflow surface configured to direct incoming air from the inlet aperture to the aircraft engine. In another aspect of this embodiment, the second inlet wall portion can include a second external airflow surface facing at least generally toward the wing tip portion.

In a further embodiment, a method for manufacturing an engine nacelle for use with an aircraft wing includes providing an inlet having an inlet aperture and an outlet having an outlet aperture. The method can further include extending a first side portion at least generally between a first edge portion of the inlet aperture and a third edge portion of the outlet aperture. In one aspect of this embodiment, the method also includes offsetting a second side portion from the first side portion and extending the second side portion at least generally between a second edge portion of the inlet aperture and a fourth edge portion of the outlet aperture to define a first interior portion. The method can additionally include offsetting a third side portion from the second side portion and extending the third side portion at least generally from the second edge portion of the inlet aperture toward the fourth edge portion of the outlet aperture to define a second interior portion. In a further aspect of this embodiment, the method also includes installing an engine in the first interior portion and mounting a landing gear assembly in the second interior portion.

DETAILED DESCRIPTION

Figure 1:
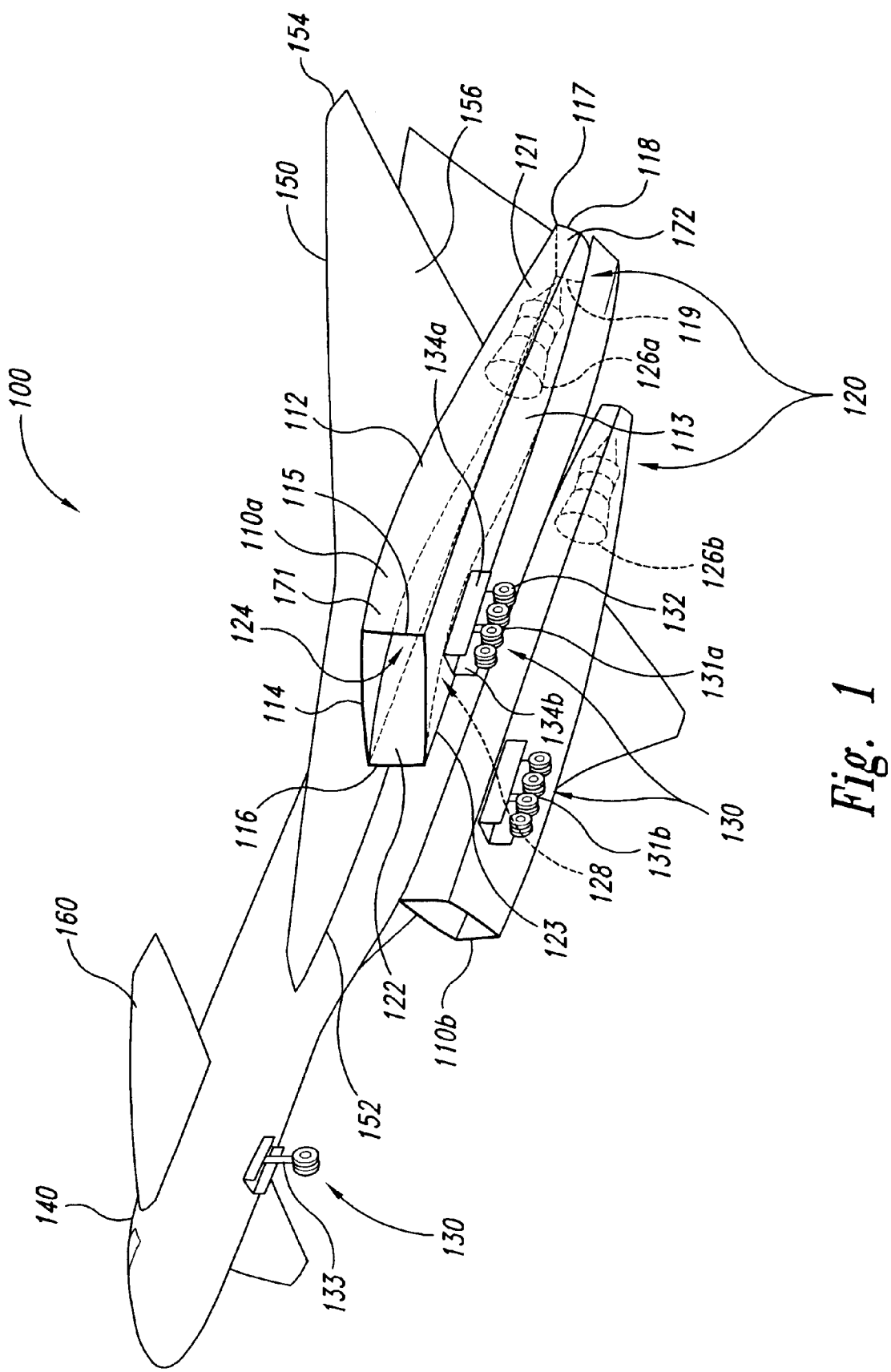
FIG. 1 is a partially hidden bottom isometric view of an aircraft having engine nacelles in accordance with an embodiment of the invention.

The following disclosure describes aircraft engine nacelles, such as aircraft engine nacelles that can accommodate both an engine and a landing gear assembly, and methods for manufacturing such aircraft engine nacelles. Certain specific details are set forth in the following description and in FIGS. 1–4 to provide a thorough understanding of various embodiments of the invention. Those of ordinary skill in the relevant art will understand, however, that the invention may have additional embodiments that may be practiced without several of the details described below. In addition, well-known structures and systems often associated with aircraft, aircraft engine nacelles, and/or landing gear assemblies have not been shown or described in detail here to avoid unnecessarily obscuring the description of the various embodiments of the invention.

In the drawings, identical reference numbers identify identical or generally similar elements. To facilitate the discussion of any particular element, the most significant digit or digits of any reference number refer to the figure in which that element is first introduced. For example, element 102 is first introduced and discussed in reference to FIG. 1. In addition, any dimensions, angles, and other specifications shown in the figures are merely illustrative of particular embodiments of the invention. Accordingly, other embodiments of the invention can have other dimensions, angles, and specifications without departing from the spirit or scope of the present invention.

FIG. 1 is a partially hidden bottom isometric view of an aircraft 100 having engine nacelles 110 (shown as a left engine nacelle 110a and a right engine nacelle 110b) configured in accordance with an embodiment of the invention. In one aspect of this embodiment, the aircraft 100 includes a fuselage 140, a first wing 150, and a second wing 160. The first wing 150 can include a wing root portion 152 fixedly attached to the fuselage 140, a wing tip portion 154, and a wing lower surface 156 extending between the wing root portion 152 and the wing tip portion 154. The second wing 160 can be smaller than the first wing 150 and can be fixedly attached to the fuselage 140 forward of the first wing 150. In another aspect of this embodiment, the aircraft 100 further includes a propulsion system 120 and a landing gear system 130. The propulsion system 120 can include left and right engines 126a and 126b (collectively, the "engines 126") housed in the left and right engine nacelles 110a and 110b, respectively. The landing gear system 130 can include a retractable nose gear 133 downwardly extendable from the fuselage 140, and retractable left and right main gears 131a and 131b (collectively, the "main gears 131") downwardly extendable from the left and right engine nacelles 110a and 110b, respectively. Accordingly, in one embodiment, each engine nacelle 100 can accommodate both an engine 126 and main gear 131.

For ease of reference, the description that follows describes the left engine nacelle 110a. However, this description is equally applicable to the right engine nacelle 110b. In one aspect of this embodiment, the left engine nacelle 110a (the "engine nacelle 110a") includes an upper portion 112 configured to fixedly attach the engine nacelle 110a at least proximate to the wing lower surface 156. In another aspect of this embodiment, the engine nacelle 110a includes an inlet 171 having an inlet aperture 114, and an outlet 172 having an outlet aperture 117. The inlet aperture 114 is positioned at least generally forward of the upper portion 112 and includes a first edge portion 115 and a second edge portion 116 offset from the first edge portion 115. The outlet aperture 117 is positioned at least generally aft of the upper portion 112 and includes a third edge portion 118 and a fourth edge portion 119 offset from the third edge portion 118.

In a further aspect of this embodiment, the engine nacelle 110a can include a first inlet wall or first side portion 121, a second inlet wall or second side portion 122, and a gear bay wall or third side portion 123. The first side portion 121 can extend at least generally from the first edge portion 115 of the inlet aperture 114 to the third edge portion 118 of the outlet aperture 117. The second side portion 122 can be offset from the first side portion 121 toward the wing root portion 152, and can extend at least generally from the second edge portion 116 of the inlet aperture 114 to the fourth edge portion 119 of the outlet aperture 117. In one aspect of this embodiment, the first and second side portions 121 and 122 define a first interior portion 124 configured to house the engine 126a between the inlet aperture 114 and the outlet aperture 117. Accordingly, the inlet aperture 114 can be configured to transfer incoming air to the engine 126a, and the outlet aperture 117 can be configured to convey exhaust gas from the engine 126a.

In another aspect of this embodiment, the third side portion 123 is offset from the second side portion 122 toward the wing root portion 152, and can extend at least generally from the second edge portion 116 of the inlet aperture 114 aft toward the outlet aperture 117. In a further aspect of this embodiment, the second and third side portions 122 and 123 define a second interior portion 128 configured to house the main gear 131a. The main gear 131a can include a wheel truck 132 positionable in a deployed static position offset from the engine nacelle 110a (as shown in FIG. 1) to support a portion of the weight of the aircraft 100 on the ground.

In another aspect of this embodiment, the engine nacelle 110a includes a lower portion 113 offset from the upper portion 112 and extending between the inlet aperture 114 and the outlet aperture 117 to at least generally enclose the first and second interior portions 124 and 128. Gear doors 134a and 134b can be hingedly attached to the lower portion 113 and configured to open and allow deployment of the main gear 131a from the second interior portion 128. In other embodiments, other gear doors and gear door arrangements can be provided in the lower portion 113. For example, in one such embodiment, a gear door can be provided forward of the wheel truck 132 and transverse to the direction of travel. In other embodiments, other gear door configurations can be provided in the lower portion 113.

Although the engine nacelles 110 are illustrated in FIG. 1 having rectangular-shaped cross-sections, in other embodiments, the engine nacelles 110 can have curved or rounded cross-sections without departing from the spirit or scope of the present invention. For example, in one such embodiment, the engine nacelles 110 can have a generally round or elliptical cross-section. In another embodiment, the engine nacelles 110 can have a generally oval cross-section. In those embodiments having curved cross-sections, the first and third side portions 121 and 123 may not appear as distinct side panels, but rather can be offset portions of a continuous external wall. Such curved cross-sections may offer certain aerodynamic drag and/or structural advantages over the rectangular cross-section illustrated in FIG. 1.

One feature of an embodiment of the present invention is the forward positioning of the inlet aperture 114 relative to the wheel truck 132. An advantage of this feature is that it can reduce the likelihood of the engine 126a sustaining FOD caused by debris kicked up by the wheel truck 132. Another feature of an embodiment of the present invention is that the second interior portion 128 of the nacelle 110a houses the main gear 131a. As explained in greater detail below, not only does this allow a shorter, and hence lighter, main gear, but it can also allow a simpler and more efficient wing structure and a more favorable fuel loading configuration.

Figure 2:
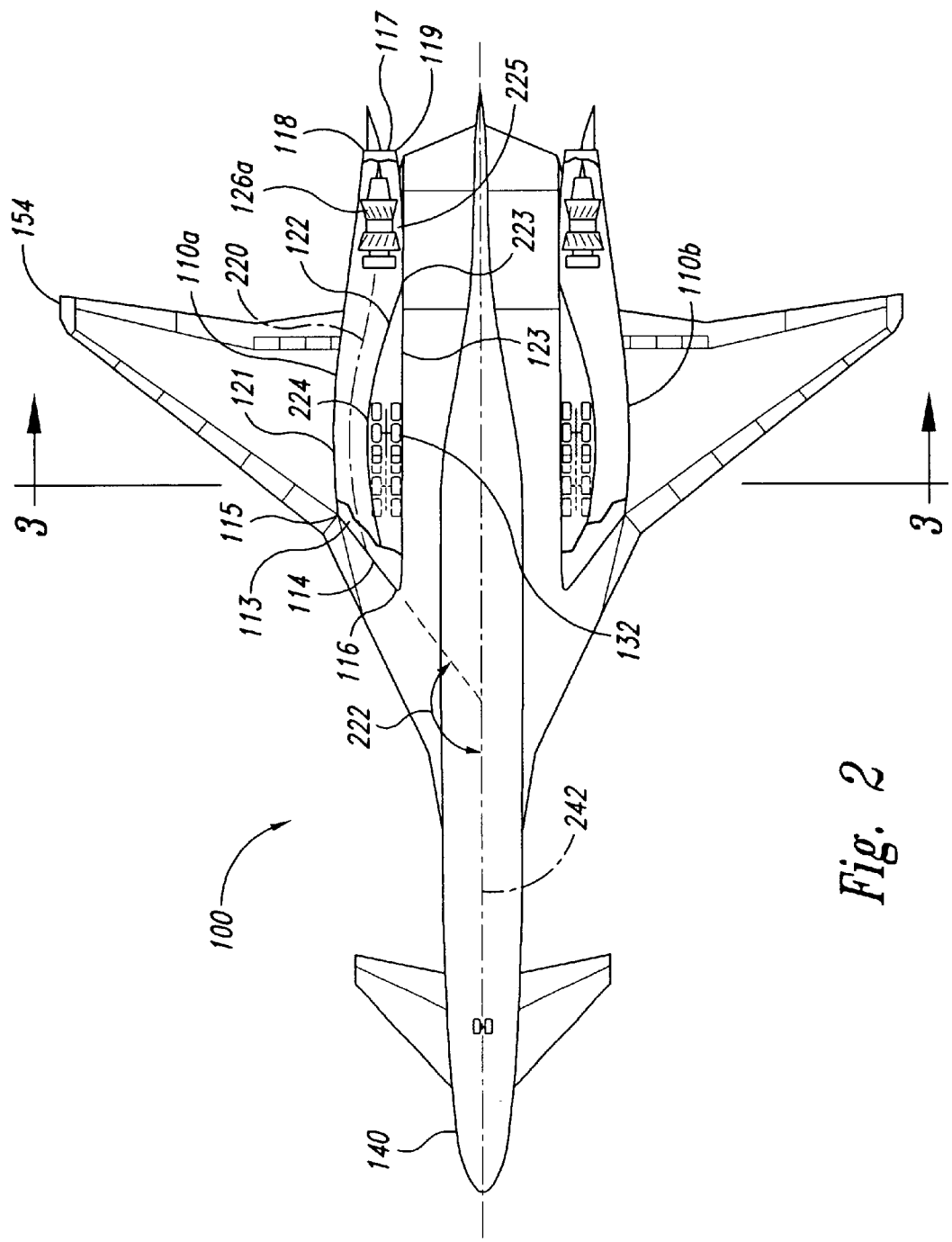
FIG. 2 is a partially cut-away bottom view of the aircraft of FIG. 1 illustrating aspects of the engine nacelles in accordance with an embodiment of the invention.

FIG. 2 is a partially cut-away bottom view of the aircraft 100 of FIG. 1 illustrating aspects of the engine nacelles 110 in accordance with an embodiment of the invention. The lower portion 113 of the nacelle 110a has been cut away in FIG. 2 for purposes of illustration. In one aspect of this embodiment, the inlet aperture 114 faces generally away from the fuselage 140 and is positioned at an angle 222 relative to a longitudinal axis 242 of the fuselage 140. In one embodiment, the angle 222 can be at least approximately 90 degrees relative to the longitudinal axis 242. For example, the angle 222 can be from about 100 degrees to about 170 degrees relative to the longitudinal axis 242. In another embodiment, the angle 222 can be from about 110 degrees to about 150 degrees relative to the longitudinal axis 242. In a further embodiment, the angle 222 can be from about 125 degrees to about 145 degrees relative to the longitudinal axis 242. In other embodiments, the angle 222 can have other values relative to the longitudinal axis 242. In any of these embodiments, an advantage of facing the inlet aperture 114 away from the fuselage 140 is the reduction of FOD caused by the injection of debris kicked up by the wheel truck 132.

In another aspect of this embodiment, the second side portion 122 includes a first region 224 extending from the second edge portion 116 of the inlet aperture 114 to a transition point 223, and a second region 225 extending from the transition point 223 to the fourth edge portion 119 of the outlet aperture 117. In the illustrated embodiment, the first region 224 is cambered toward the wing tip portion 154, and the second region 225 is at least generally flat or "uncambered." In a further aspect of this embodiment, the first side portion 121 is also cambered toward the wing tip portion 154 between the first edge portion 115 of the inlet aperture 114 and the third edge portion 118 of the outlet aperture 117. Accordingly, air for the engine 126a travels along a curved path 220 through the first interior portion 124 from the inlet aperture 114 to the engine 126a.

In another aspect of this embodiment, the third side portion 123 is generally aligned with the second region 225 of the second side portion 122 at the transition point 223 to provide a smooth transition between the third side portion 123 and the second region 225. In a further aspect of this embodiment, the third side portion 123 and the second region 225 can be at least generally coplanar to provide a generally flat surface between the second edge portion 116 of the inlet aperture 114 and the fourth edge portion 119 of the outlet aperture 117. In one aspect of this embodiment, the generally flat surface provided by the third side portion 123 and the second region 225 can be at least generally parallel to the longitudinal axis 242. In other embodiments, the third side portion 123 and the second region 225 can have other shapes relative to the longitudinal axis 242.

One feature of an embodiment of the engine nacelle 110a as described above and shown in FIG. 2 is the outboard facing angle 222 of the inlet aperture 114 relative to the longitudinal axis 242. An advantage of this feature is that it reduces the likelihood of the engine 126a ingesting debris kicked up by the wheel truck 132. Another advantage of this feature is that it directs engine noise away from the fuselage 140 and any passengers travelling therein. Another feature of an embodiment of the engine nacelle 110a is the basic cambered shape of the engine nacelle 110a as provided by the cambered first side portion 121 and the generally flat third side portion 123, as shown in FIG. 2. An advantage of this feature is a reduction in aerodynamic drag over, for example, comparable symmetrical engine nacelle configurations.

Figure 3:
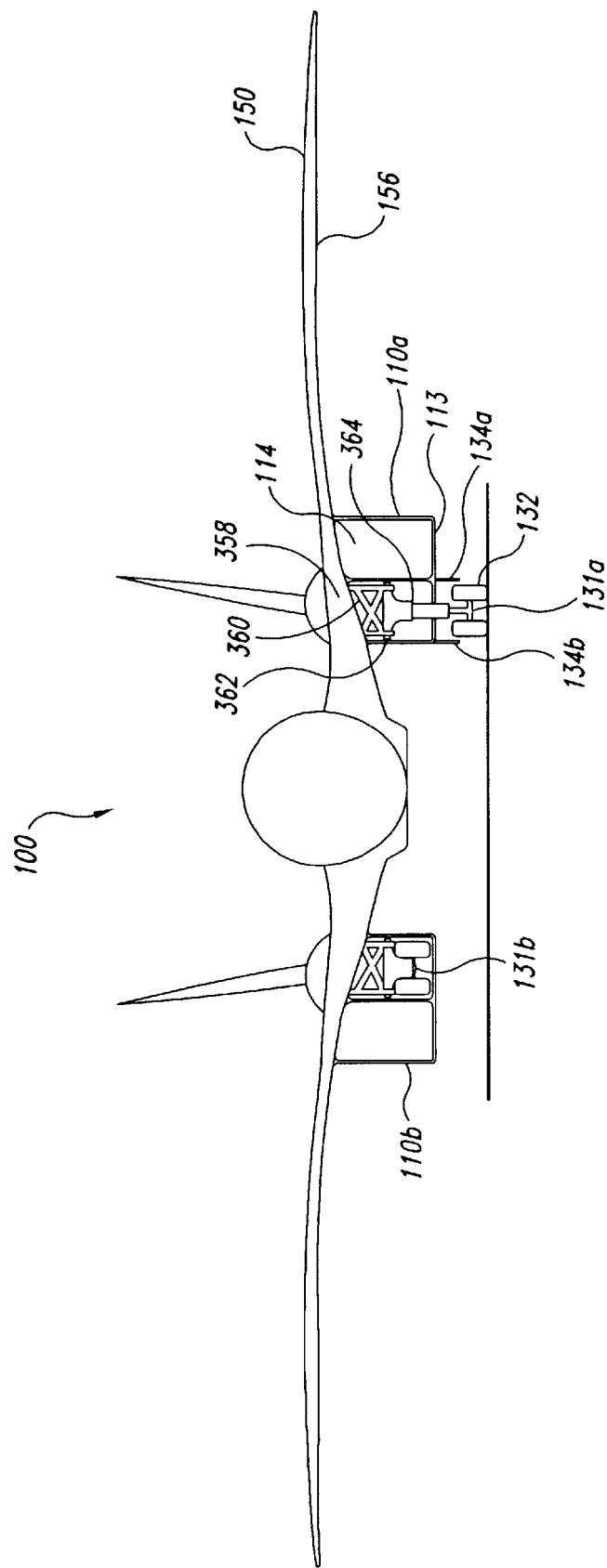
FIG. 3 is a forward cross-sectional elevation view of the aircraft of FIG. 1 illustrating other aspects of the engine nacelles in accordance with an embodiment of the invention taken substantially along line 3—3 in FIG. 2.

FIG. 3 is a forward cross-sectional elevation view of the aircraft 100 illustrating aspects of the engine nacelles 110 in accordance with an embodiment of the invention taken substantially along line 3—3 in FIG. 2. For purposes of illustration, the left main gear 131a is shown in the deployed static position for take off and landing, and the right main gear 131b is shown in a retracted static position stowed in the right engine nacelle 110b for flight. Referring to the left engine nacelle 110a, in one aspect of this embodiment, the left main gear 131a includes a main strut 364 pivotally extending between a trunnion 362 and the wheel truck 132. The trunnion 362 can be offset from the wing lower surface 156 and supported by a trunnion support structure 360, such as a lightweight truss structure.

In another aspect of this embodiment, the gear doors 134a and 134b open downwardly and outwardly from the lower portion 113 of the nacelle 110a when lowering the main gear 131a. The main strut 364 can then pivot downwardly about the trunnion 362 to position the wheel truck 132 in the deployed static position as shown in FIG. 3. In a further aspect of this embodiment, the gear doors 134a and 134b are positioned on opposite sides of the main gear 131a and at least proximate to the wheel truck 132.

One feature of an embodiment of the invention illustrated in FIG. 3 is the relatively short main gear 131a. On conventional aircraft having the main gears housed in wheel wells in the wing, the main gears must extend from the wing lower surface to the ground. In contrast, by housing the main gear 131a in the engine nacelle 110a, the trunnion 362 can be offset downwardly from the lower surface 156, allowing the main gear 131a to be shorter than a conventional main gear. An advantage of this feature is that the main gear 131a can be lighter than a conventional main gear and can reduce overall airframe weight.

Another feature of an embodiment of the invention is the relatively short gear doors 134a and 134b (collectively, the "gear doors 134"). The close proximity of the lower portion 113 of the engine nacelle 110a to the ground allows the gear doors 134 to be relatively short and still extend at least proximate to the wheel truck 132. One advantage of this feature is that the gear doors 134 experience relatively low aerodynamic loads, and as a result can be relatively lightweight. Another advantage of this feature is the shielding effect provided by the gear doors 134, which can reduce the likelihood that debris generated by the wheel truck 132 will enter the inlet aperture 114 and damage the engines 126 (FIGS. 1 and 2). In contrast, conventional aircraft having the main gears housed in wheel wells in the wing require relatively long gear doors if the gear doors are to extend from the wing to proximate the deployed wheel truck. The high aerodynamic loads on such doors when fully extended can require them to be undesirably heavy.

A further feature of an embodiment of the invention is that the main gear 131a is accommodated by the engine nacelle 110a instead of the first wing 150. This simplifies the load-carrying structure of the first wing 150 and allows more efficient load paths resulting in lower airframe weight. This feature further allows the first wing 150 to have a relatively thin cross-sectional profile, instead of a thick cross-sectional profile to accommodate the main gear 131a in the retracted static position.

Another feature of an embodiment of the invention is that the engine nacelles 110 can be structural nacelles. "Structural," as used here, means that the nacelles 110 are strong enough to support at least a portion of the weight of the aircraft 100 in the unlikely event one of the main gears 131 collapses. This strength can be provided by one or more of the first side portion 121, the second side portion 122, or the third side portion 123. An advantage of this feature is that the engine nacelle 110a, for example, will prevent the ground from forcing the main gear 131a upward and into the structure of the first wing 150 if the main gear 131a collapses. Because of this, the first wing 150 can include a fuel tank 358 positioned above the main gear 131a without the possibility of the main gear 131a puncturing the fuel tank 358 if the main gear 131 a collapses.

Figure 4:
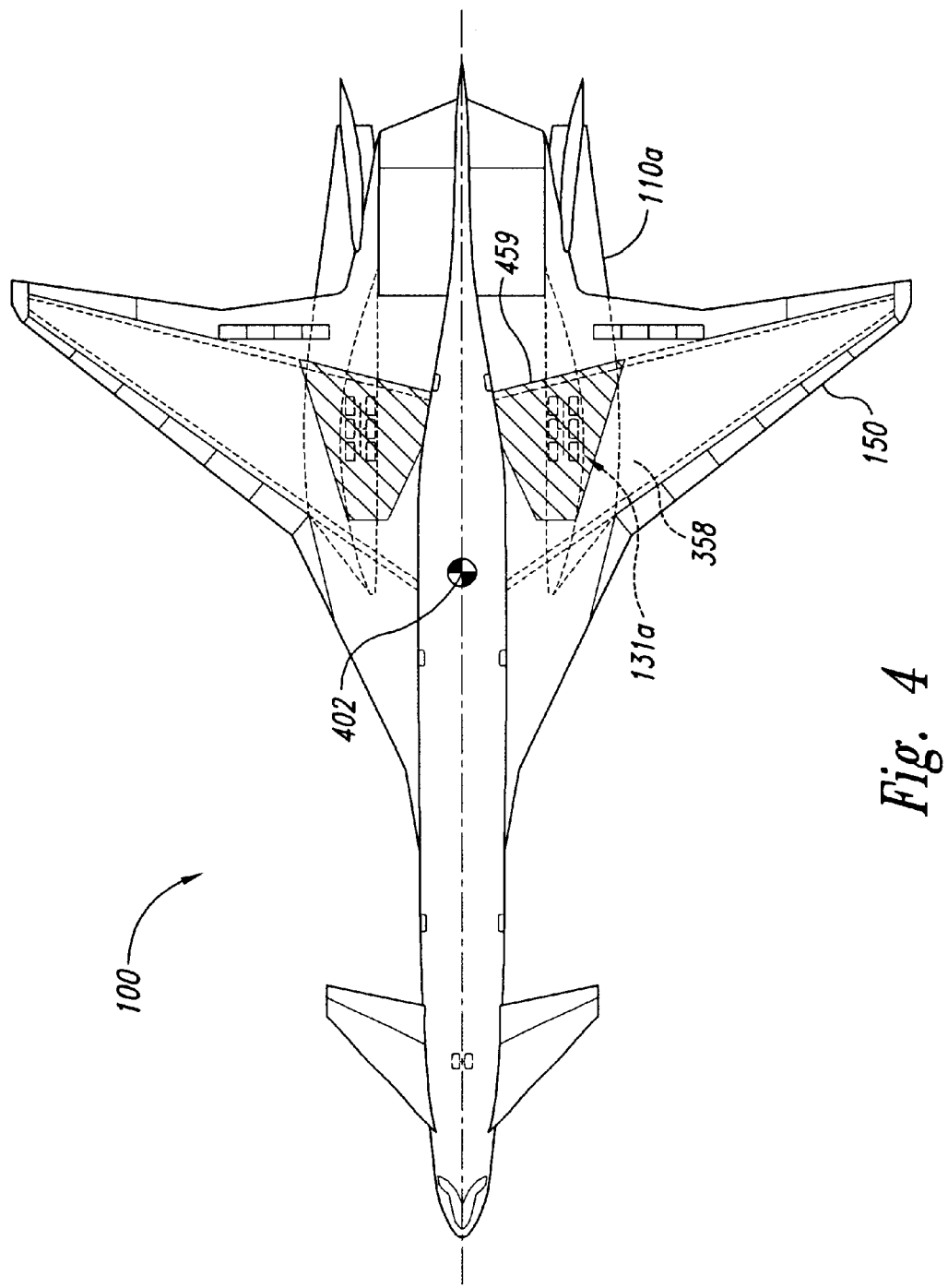
FIG. 4 is a partially hidden top view of the aircraft of FIG. 1 illustrating aspects of a main wing in accordance with an embodiment of the invention.

FIG. 4 is a partially hidden top view of the aircraft 100 illustrating aspects of the first wing 150 in accordance with an embodiment of the invention. In one aspect of this embodiment, the wing tank 358 includes a fuel tank portion 459 (represented by the cross-hatched area) configured to carry fuel in vertical alignment with the main gear 131a. As mentioned above with reference to FIG. 3, conventional aircraft typically have a dry bay in this region to avoid a fuel tank puncture in the event of a gear collapse. The ability of the first wing 150 to carry fuel in the fuel tank portion 459 not only increases the fuel capacity of the aircraft 100, but it also helps to balance the aircraft 100 about a center of gravity (CG) 402, reducing the need to use aerodynamic forces for balance. Using aerodynamic forces to balance an aircraft often results in an undesirable drag penalty. Thus, housing the main gear 131a in the engine nacelle 110a in accordance with embodiments of the present invention can increase fuel capacity and reduce aerodynamic drag.

From the foregoing, it will be appreciated that specific embodiments of the invention have been described herein for purposes of illustration, but that various modifications may be made without deviating from the spirit and scope of the invention. For example, although this disclosure describes an aircraft having two engine nacelles, those of ordinary skill in the relevant art will appreciate that the embodiments described as equally applicable to other aircraft configurations having more or fewer engine nacelles. Further, although this disclosure describes engine nacelles having wheel wells inboard of engine inlets, in other embodiments, the wheel wells can be positioned outboard of the engine inlets without departing from the spirit or scope of the present invention. Accordingly, the invention is not limited, except as by the appended claims.

I claim:

1. An engine nacelle for use with an aircraft having a wing, the wing having a wing root portion, the engine nacelle comprising:
   an inlet having an inlet aperture;
   an inlet wall portion having an internal airflow surface configured to direct incoming air from the inlet aperture to an aircraft engine; and
   a gear bay wall portion offset from the inlet wall portion toward the wing root portion to at least partially define a gear bay between the inlet wall portion and the gear bay wall portion, wherein the gear bay is configured to house a landing gear assembly having a wheel truck moveable between a stowed position and a deployed static position offset from the engine nacelle to support at least a portion of the weight of the aircraft.

2. The engine nacelle of claim 1 wherein the gear bay wall portion has an external airflow surface facing at least generally toward the wing root portion.

3. The engine nacelle of claim 1 wherein the inlet wall portion is a first inlet wall portion and the internal airflow surface is a first internal airflow surface, wherein the engine nacelle further comprises a second inlet wall portion offset from the first inlet wall portion, the second inlet wall portion having a second internal airflow surface configured to direct incoming air from the inlet aperture to the aircraft engine.

4. The engine nacelle of claim 1 wherein the gear bay wall portion has a first external airflow surface facing at least generally toward the wing root portion, wherein the inlet wall portion is a first inlet wall portion and the internal airflow surface is a first internal airflow surface, wherein the engine nacelle further comprises a second inlet wall portion offset from the first inlet wall portion, the second inlet wall portion having a second internal airflow surface configured to direct incoming air from the inlet aperture to the aircraft engine, the second inlet wall portion further having a second external airflow surface facing at least generally away from the wing root portion.

5. The engine nacelle of claim 1 wherein the gear bay wall portion has a generally flat first external airflow surface facing toward the wing root portion, wherein the inlet wall portion is a first inlet wall portion and the internal airflow surface is a first internal airflow surface, wherein the engine nacelle further comprises a second inlet wall portion offset from the first inlet wall portion, the second inlet wall portion having a second internal airflow surface configured to direct incoming air from the inlet aperture to the aircraft engine, the second inlet wall portion further having a second external airflow surface facing at least generally away from the wing root portion, wherein the second external airflow surface is cambered away from the wing root portion.

6. The engine nacelle of claim 1, further comprising the wheel truck, and wherein the wheel truck is positioned at least generally aft of the inlet aperture when the wheel truck is in the deployed static position.

7. The engine nacelle of claim 1 wherein the inlet aperture faces at least generally away from the wing root portion.

8. The engine nacelle of claim 1, further comprising at least one landing gear door proximate to the gear bay, the landing gear door having a closed position and an open position, wherein the landing gear door is at least proximate to the wheel truck when the landing gear door is in the open position and the wheel truck is in the deployed static position.

9. The engine nacelle of claim 1 wherein the aircraft further includes a fuselage having a longitudinal axis, and wherein the engine nacelle further comprises a landing gear trunnion fixedly attached at least proximate to the gear bay, wherein the landing gear assembly is pivotally connected to the landing gear trunnion and pivotally moveable about the trunnion parallel to the longitudinal axis to position the wheel truck in the deployed static position.

10. An engine nacelle for use with an aircraft having a wing, the engine nacelle comprising:
   an inlet having an inlet aperture;
   a first inlet wall portion having a first internal airflow surface configured to direct incoming air from the inlet aperture to an aircraft engine;
   a second inlet wall portion offset from the first inlet wall portion and having a second internal airflow surface configured to direct incoming air from the inlet aperture to the aircraft engine, the second inlet wall portion further having a first external airflow surface; and
   a gear bay wall portion having a second external airflow surface, the gear bay wall being offset from the first inlet wall portion to at least partially define a gear bay between the first inlet wall portion and the gear bay wall portion, wherein the gear bay is configured to house a landing gear assembly having a wheel truck moveable between a stowed position and a deployed static position offset from the engine nacelle to support at least a portion of the weight of the aircraft.

11. The engine nacelle of claim 10 wherein the wing includes a wing root portion, wherein the first external airflow surface faces away from the wing root portion, and wherein the second external airflow surface faces at least generally toward the wing root portion.

12. The engine nacelle of claim 10 wherein the first external airflow surface is at least generally cambered and the second external airflow surface is at least generally flat.

13. The engine nacelle of claim 10 wherein the wing includes a wing root portion, wherein the first external airflow surface faces away from the wing root portion and is at least generally cambered away from the wing root portion, and wherein the second external airflow surface faces toward the wing root portion and is at least generally flat.

14. The engine nacelle of claim 10, further comprising the wheel truck, and wherein the wheel truck is positioned at least generally aft of the inlet aperture when the wheel truck is in the deployed static position.

15. The engine nacelle of claim 10 wherein the inlet aperture faces at least generally away from the wing root portion.

16. The engine nacelle of claim 10, further comprising the wheel truck and at least one landing gear door proximate to the gear bay, the landing gear door having a closed position and an open position, wherein the landing gear door is at least proximate to the wheel truck when the landing gear door is in the open position and the wheel truck is in the deployed static position.

17. The engine nacelle of claim 10 wherein the aircraft further includes a fuselage having a longitudinal axis, and wherein the engine nacelle further comprises a landing gear trunnion fixedly attached at least proximate to the gear bay, wherein the landing gear assembly is pivotally connected to the landing gear trunnion and pivotally moveable about the trunnion parallel to the longitudinal axis to position the wheel truck in the deployed static position.

18. An engine nacelle for use with an aircraft having a wing, the wing having a wing root portion and a wing tip portion, the nacelle comprising:
    an inlet having an inlet aperture, the inlet aperture including a first edge portion and a second edge portion offset from the first edge portion;
    an outlet having an outlet aperture, the outlet aperture including a third edge portion and a fourth edge portion offset from the third edge portion;
    a first side portion extending at least generally between the first edge portion of the inlet aperture and the third edge portion of the outlet aperture;
    a second side portion offset from the first side portion toward the wing root portion, the second side portion extending at least generally between the second edge portion of the inlet aperture and the fourth edge portion of the outlet aperture to define a first interior portion between the first and second side portions configured to house an engine, the inlet aperture being configured to transfer incoming air to the engine and the outlet aperture being configured to convey exhaust gas from the engine; and
    a third side portion offset from the second side portion toward the wing root portion, the third side portion extending at least generally from the second edge portion of the inlet aperture toward the fourth edge portion of the outlet aperture to at least partially define a second interior portion between the second and third side portions configured to house a landing gear assembly, the landing gear assembly having a wheel truck moveable between a stowed position and a deployed static position offset from the engine nacelle to support at least a portion of the weight of the aircraft.

19. The engine nacelle of claim 18 wherein the second side portion has a first region and a second region, the first region being at least generally cambered and extending from the second edge portion of the inlet aperture to a transition point, the second region being at least generally flat and extending from the transition point to the fourth edge portion of the outlet aperture, and wherein the third side portion is at least generally flat and extending from at least proximate the second edge portion of the inlet aperture to at least proximate the transition point.

20. The engine nacelle of claim 18 wherein the second side portion has a first region and a second region, the first region being at least generally cambered toward the wing tip portion and extending from the second edge portion of the inlet aperture to a transition point, the second region being at least generally flat and extending from the transition point to the fourth edge portion of the outlet aperture, and wherein the third side portion is at least generally flat and extending from at least proximate the second edge portion of the inlet aperture to at least proximate the transition point.

21. The engine nacelle of claim 18 wherein the second side portion has a first region and a second region, the first region being at least generally cambered toward the wing tip portion and extending from the second edge portion of the inlet aperture to a transition point, the second region being at least generally flat and extending from the transition point to the fourth edge portion of the outlet aperture, and wherein the third side portion is at least generally coplanar with the second region of the second side portion.

22. The engine nacelle of claim 18, further comprising the wheel truck, and wherein the wheel truck is positioned at least generally aft of the inlet aperture when the wheel truck is in the deployed static position.

23. The engine nacelle of claim 18 wherein the aircraft further includes a fuselage having a longitudinal axis, wherein the inlet aperture is positioned at an angle from about 100 degrees to about 170 degrees relative to the longitudinal axis of the fuselage.

24. The engine nacelle of claim 18 wherein the aircraft further includes a fuselage having a longitudinal axis, wherein the inlet aperture is positioned at an angle from about 110 degrees to about 150 degrees relative to the longitudinal axis of the fuselage.

25. The engine nacelle of claim 18 wherein the first interior portion has a centerline at least partially cambered toward the wing tip portion between the inlet aperture and the outlet aperture.

26. The engine nacelle of claim 18, further comprising a lower portion extending at least generally between the first and third side portions between the inlet and outlet apertures, the lower portion including at least one landing gear door proximate to the second interior portion.

27. The engine nacelle of claim 18, further comprising the wheel truck and a lower portion extending at least generally between the first and third side portions between the inlet and outlet apertures, the lower portion including at least one landing gear door proximate to the second interior portion, the landing gear door having a closed position and an open position, wherein the landing gear door is at least proximate to the wheel truck when the landing gear door is in the open position and the wheel truck is in the deployed static position.

28. The engine nacelle of claim 18, further comprising the wheel truck, and wherein the inlet aperture faces at least generally away from the wing root portion, wherein the wheel truck is positioned at least generally aft of the inlet aperture when the wheel truck is in the deployed static position, and wherein the second side portion has a first region and a second region, the first region being at least generally cambered toward the wing tip portion and extending from the second edge portion of the inlet aperture to a transition point, the second region being at least generally flat and extending from the transition point to the fourth edge portion of the outlet aperture.

29. The engine nacelle of claim 18 wherein the aircraft further includes a fuselage having a longitudinal axis, and wherein the engine nacelle further comprises the wheel truck and a landing gear trunnion fixedly attached at least proximate to the second interior portion, wherein the landing gear assembly is pivotally connected to the landing gear trunnion and pivotally moveable about the trunnion parallel to the longitudinal axis to position the wheel truck in the deployed static position.

30. An aircraft wing comprising:
a wing root portion;
a wing tip portion;
a wing lower surface extending at least generally between the wing tip portion and the wing root portion;
an engine nacelle positioned at least proximate to the wing lower surface, the engine nacelle including:
an inlet having an inlet aperture;
a first inlet wall portion having a first internal airflow surface configured to direct incoming air from the inlet aperture to an aircraft engine;
a second inlet wall portion offset from the first inlet wall and having a second internal airflow surface configured to direct incoming air from the inlet aperture to the aircraft engine, the second inlet wall portion further having a first external airflow surface; and
a gear bay wall portion having a second external airflow surface, the gear bay wall being offset from the first inlet wall portion to at least partially define a gear bay between the first inlet wall portion and the gear bay wall portion, wherein the gear bay is configured to house a landing gear assembly having a wheel truck moveable between a stowed position and a deployed static position offset from the engine nacelle to support at least a portion of the weight of the aircraft.

31. The wing of claim 30 wherein the first external airflow surface faces away from the wing root portion, and wherein the second external airflow surface faces at least generally toward the wing root portion.

32. The wing of claim 30 wherein the wing is a first wing and the aircraft includes a fuselage and a second wing, wherein the first wing is configured to be fixedly attached to the fuselage in a first position, and wherein the second wing is configured to be fixedly attached to the fuselage in a second position forward of the first position.

33. The wing of claim 30 wherein the wing is a first wing and the aircraft includes a fuselage and a second wing, wherein the first wing has a first area and the second wing has a second area less than the first wing, wherein the first wing is configured to be fixedly attached to the fuselage in a first position, and wherein the second wing is configured to be fixedly attached to the fuselage in a second position forward of the first position.

34. The wing of claim 30, further comprising a fuel tank portion configured to carry fuel, wherein the fuel tank portion is positioned in vertical alignment with the landing gear assembly.

35. The wing of claim 30 wherein the second inlet wall portion is offset from the first inlet wall portion toward the wing tip portion, and wherein the gear bay wall portion is offset from the first inlet wall portion toward the wing root portion.

36. The wing of claim 30, further comprising the wheel truck, and wherein the wheel truck is positioned at least generally aft of the inlet aperture when the wheel truck is in the deployed static position.

37. The wing of claim 30 wherein the inlet aperture faces at least generally away from the wing root portion.

38. The wing of claim 30 wherein the aircraft further includes a fuselage having a longitudinal axis, and wherein the engine nacelle further comprises the wheel truck and a landing gear trunnion fixedly attached at least proximate to the gear bay, wherein the landing gear assembly is pivotally connected to the landing gear trunnion and pivotally moveable about the trunnion parallel to the longitudinal axis to position the wheel truck in the deployed static position.

39. An aircraft comprising:
a fuselage;
a wing having a wing root portion fixedly attached to the fuselage, a wing tip portion, and a wing lower surface extending at least generally between the wing tip portion and the wing root portion; and
an engine nacelle positioned at least proximate to the wing lower surface, the engine nacelle including:
an inlet having an inlet aperture;
a first inlet wall portion having a first internal airflow surface configured to direct incoming air from the inlet aperture to an aircraft engine;
a second inlet wall portion offset from the first inlet wall and having a second internal airflow surface configured to direct incoming air from the inlet aperture to the aircraft engine, the second inlet wall portion further having a first external airflow surface; and
a gear bay wall portion having a second external airflow surface, the gear bay wall being offset from the first inlet wall portion to at least partially define a gear bay between the first inlet wall portion and the gear bay wall portion, wherein the gear bay is configured to house a landing gear assembly having a wheel truck moveable between a stowed position and a deployed static position offset from the engine nacelle to support at least a portion of the weight of the aircraft.

40. The aircraft of claim 39, further comprising a center of gravity positioned at least proximate to the fuselage, wherein the aircraft engine is positioned aft of the center of gravity, wherein the deployed static position of the wheel truck is positioned aft of the center of gravity and forward of the aircraft engine, and wherein the inlet aperture is positioned forward of the deployed static position of the wheel truck.

41. The aircraft of claim 39, further comprising a center of gravity positioned at least proximate to the fuselage, wherein the wing includes a fuel tank portion configured to carry fuel, wherein the fuel tank portion is positioned aft of the center of gravity and in vertical alignment with the landing gear assembly.

42. The aircraft of claim 39 wherein the wing is a first wing and the aircraft includes a second wing smaller than the first wing, and wherein the second wing is fixedly attached to the fuselage forward of the first position.

43. The aircraft of claim 39 wherein the inlet aperture faces generally away from the fuselage.

44. The aircraft of claim 39 wherein the second inlet wall portion is offset from the first inlet wall portion toward the wing tip portion, and wherein the gear bay wall portion is offset from the first inlet wall portion toward the wing root portion.

45. The aircraft of claim 39 wherein the engine nacelle is a first engine nacelle and the aircraft includes a second engine nacelle, wherein the first and second engine nacelles are configured to support the weight of the aircraft.

46. A method for manufacturing an engine nacelle for use with an aircraft wing, the method comprising:
positioning a first side portion at least generally below the aircraft wing;
positioning a second side portion offset from the first side portion, the first and second side portions at least partially defining an inlet aperture, an outlet aperture, and a first interior portion between the first and second side portions;
installing an engine in the first interior portion, wherein the inlet aperture is configured to transfer incoming air to the engine and the outlet aperture is configured to convey exhaust gas from the engine;
positioning a third side portion offset from the second side portion, the third side portion extending at least generally from the inlet aperture toward the outlet aperture to define a second interior portion between the second and third side portions; and
mounting a landing gear assembly in the second interior portion, the landing gear assembly having a wheel truck moveable between a stowed position and a deployed static position offset from the engine nacelle to support at least a portion of the weight of the aircraft.

47. The method of claim 46 wherein the aircraft wing includes a wing root portion, wherein positioning the second side portion includes positioning the second side portion toward the wing root portion, and wherein positioning the third side portion includes positioning the third side portion toward the wing root portion.

48. The method of claim 46 wherein the aircraft wing is configured to be fixedly attached to a fuselage, and wherein positioning the first and second side portions includes positioning the inlet aperture to face generally away from the fuselage.

49. The method of claim 46 wherein the aircraft wing is configured to be fixedly attached to a fuselage having a longitudinal axis, and wherein positioning the first and second side portions includes positioning the inlet aperture at an angle from about 125 degrees to about 145 degrees relative to the longitudinal axis.

50. The method of claim 46 wherein the wing includes a wing tip portion, and wherein positioning the second side portion includes cambering at least a portion of the second side portion toward the wing tip portion.

51. The method of claim 46 wherein the wing includes a wing tip portion, wherein positioning the second side portion includes cambering at least a portion of the second side portion toward the wing tip portion to provide the first interior portion with a centerline having a cambered portion, wherein the inlet aperture is configured to transfer incoming air to the engine along the cambered portion of the centerline.

52. The method of claim 46 wherein mounting the landing gear assembly in the second interior portion includes installing the landing gear assembly to deploy the wheel truck at least generally aft of the inlet aperture.

53. The method of claim 46, further comprising positioning a lower portion at least generally between the first and third side portions between the inlet and outlet apertures, the lower portion including at least one landing gear door proximate to the second interior portion, the landing gear door having a closed position and an open position, wherein the landing gear door is at least proximate to the wheel truck when the landing gear door is in the open position and the wheel truck is in the deployed static position.

54. The method of claim 46 wherein the aircraft wing is configured to be mounted to a fuselage having a longitudinal axis, and wherein the method further comprises fixedly attaching a landing gear trunnion at least proximate to the second interior portion, wherein the landing gear assembly is pivotally connected to the landing gear trunnion and pivotally moveable about the trunnion parallel to the longitudinal axis to position the wheel truck in the deployed static position.

55. A method for manufacturing an aircraft, the method comprising:
joining a wing to a fuselage;
positioning an inlet at least generally below the wing, the inlet having an inlet aperture;
positioning a first inlet wall portion aft of the inlet aperture, the first inlet wall having a first internal airflow surface configured to direct incoming air from the inlet aperture to an aircraft engine;
positioning a second inlet wall portion offset from the first inlet wall portion, the second inlet wall portion having a second internal airflow surface configured to direct incoming air from the inlet aperture to the aircraft engine, the second inlet wall portion further having a first external airflow surface; and
positioning a gear bay wall portion offset from the first inlet wall portion to at least partially define a gear bay between the first inlet wall portion and the gear bay wall portion, the gear bay wall portion having a second external airflow surface, wherein the gear bay is configured to house a landing gear assembly having a wheel truck moveable between a stowed position and a deployed static position offset from the engine nacelle to support at least a portion of the weight of the aircraft.

56. The method of claim 55 wherein positioning the gear bay wall portion includes positioning the gear bay wall portion toward the fuselage, wherein positioning the second inlet wall portion includes positioning the second inlet wall portion away from the fuselage, and wherein positioning the inlet includes orienting the inlet aperture to face generally away from the fuselage.

57. The method of claim 55, further comprising installing a landing gear assembly in the gear bay, wherein the landing gear assembly is configured to position the wheel truck at least generally aft of the inlet aperture in the deployed static position.

58. The method of claim 55, further comprising installing a fuel tank portion in the wing, the fuel tank portion configured to carry fuel in vertical alignment with the landing gear assembly.

59. The method of claim 55 wherein joining the wing to the fuselage includes fixedly attaching a first wing to the fuselage in a first location, wherein the method further comprises fixedly attaching a second wing to the fuselage in a second location forward of the first location, and wherein the second wing is smaller than the first wing.

60. The method of claim 55 wherein positioning the inlet includes orienting the inlet aperture to face generally away from the fuselage.

61. The method of claim 55 wherein the wing includes a wing tip portion, and wherein positioning the second inlet wall portion includes cambering at least a portion of the second inlet wall portion toward the wing tip portion.

62. The method of claim 55, further comprising positioning a lower portion at least generally between the second inlet wall portion and the gear bay wall portion, the lower portion including at least one landing gear door proximate to the gear bay, wherein the landing gear door is at least proximate to the wheel truck when the landing gear door is in an open position and the wheel truck is in the deployed static position.

63. The method of claim 55 wherein the fuselage has a longitudinal axis, and wherein the method further comprises fixedly attaching a landing gear trunnion at least proximate to the gear bay, wherein the landing gear assembly is pivotally connected to the landing gear trunnion and pivotally moveable about the trunnion parallel to the longitudinal axis to position the wheel truck in the deployed static position.

* * * * *